United States Patent
James

(10) Patent No.: US 8,021,051 B2
(45) Date of Patent: Sep. 20, 2011

(54) SLEEVE BEARING ASSEMBLY AND METHOD OF CONSTRUCTION

(75) Inventor: Benjamin B. James, Birchrunville, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 1102 days.

(21) Appl. No.: 11/769,278

(22) Filed: Jun. 27, 2007

(65) Prior Publication Data

US 2008/0006061 A1 Jan. 10, 2008

Related U.S. Application Data

(60) Provisional application No. 60/806,752, filed on Jul. 7, 2006.

(51) Int. Cl.
F16C 33/18 (2006.01)
F16C 33/02 (2006.01)

(52) U.S. Cl. ......... 384/298; 384/276; 384/282; 384/606

(58) Field of Classification Search .......... 384/220, 384/291–292, 298, 300, 276, 282, 606; 139/383, 139/386, 452; 29/898.06, 898.046, 898.054, 29/989.15
See application file for complete search history.

(56) References Cited

U.S. PATENT DOCUMENTS

| | | | |
|---|---|---|---|
| 1,964,202 A | 11/1931 | Hooper | |
| 2,128,087 A * | 8/1938 | Gatke | 384/298 |
| 3,033,623 A | 5/1962 | Thomson | |
| 3,068,053 A | 12/1962 | Runton et al. | |
| 3,097,060 A * | 7/1963 | Sullivan, Jr. | 384/220 |
| 3,110,530 A | 12/1963 | Herman | |
| 3,328,100 A | 6/1967 | Spokes et al. | |
| 3,616,000 A | 10/1971 | Butzow et al. | |
| 3,692,375 A | 9/1972 | Matt et al. | |
| 3,804,479 A | 4/1974 | Butzow et al. | |
| 3,806,216 A | 4/1974 | Orkin et al. | |
| 3,929,396 A | 12/1975 | Orkin et al. | |
| 3,950,599 A | 4/1976 | Board, Jr. | |
| 4,048,370 A | 9/1977 | Orkin et al. | |
| 4,107,381 A | 8/1978 | Butzow et al. | |
| 4,134,842 A | 1/1979 | Orkin et al. | |
| 4,174,739 A * | 11/1979 | Rasero et al. | 139/388 |
| 4,189,985 A | 2/1980 | Harris | |
| 4,358,167 A | 11/1982 | Magazian et al. | |
| 4,369,818 A | 1/1983 | Yoshida | |

(Continued)

FOREIGN PATENT DOCUMENTS

JP 01093619 A 4/1989
(Continued)

Primary Examiner — Marcus Charles
(74) Attorney, Agent, or Firm — Robert L. Stearns; Dickinson Wright, PLLC

(57) ABSTRACT

A sleeve bearing assembly and method of construction therefore has an inner portion constructed from a plurality of yarns to provide a journal bearing surface for receipt of a journal for relative movement therein and an elastic outer portion injection molded at least partially about the inner portion. The plurality of yarns are woven together with at least some of the yarns being woven in a warp direction corresponding to a length of the journal bearing surface and in a weft direction corresponding to a circumferential direction of the journal bearing surface to form a backing of the inner portion. At least one of the plurality of yarns is provided as a self-lubricating yarn woven with the backing in a weft direction to substantially form the bearing surface radially inwardly of the backing.

10 Claims, 3 Drawing Sheets

U.S. PATENT DOCUMENTS

| | | | |
|---|---|---|---|
| 4,717,268 A | 1/1988 | Orkin | |
| 4,842,424 A | 6/1989 | Narkon et al. | |
| 4,916,749 A | 4/1990 | Urban et al. | |
| 4,976,550 A | 12/1990 | Shobert | |
| 5,137,374 A | 8/1992 | Orkin | |
| 5,373,637 A | 12/1994 | Harris et al. | |
| 5,417,499 A | 5/1995 | Jacques et al. | |
| 5,431,500 A | 7/1995 | Harris et al. | |
| 5,685,648 A | 11/1997 | Harris et al. | |
| 5,843,542 A * | 12/1998 | Brushafer et al. | 428/36.1 |
| 6,328,080 B1 * | 12/2001 | Winters | 139/388 |
| 6,581,645 B1 * | 6/2003 | Johnson et al. | 139/383 A |
| 6,950,599 B2 * | 9/2005 | Nicholls et al. | 385/147 |
| 7,121,306 B2 * | 10/2006 | Harrison | 139/440 |
| 7,188,642 B2 * | 3/2007 | James et al. | 139/384 R |
| 7,216,678 B2 | 5/2007 | Baer | |
| 2003/0035602 A1 | 2/2003 | Shobert et al. | |
| 2004/0213492 A1 | 10/2004 | Kim et al. | |
| 2005/0185902 A1 * | 8/2005 | James et al. | 385/100 |
| 2005/0186367 A1 | 8/2005 | Hanrhan | |
| 2006/0054346 A1 * | 3/2006 | Gladfelter et al. | 174/74 A |
| 2007/0190879 A1 * | 8/2007 | Gondoh et al. | 442/181 |

FOREIGN PATENT DOCUMENTS

| | | | |
|---|---|---|---|
| JP | 03152237 A | * | 6/1991 |
| JP | 03292198 A | * | 12/1991 |

* cited by examiner

SLEEVE BEARING ASSEMBLY AND METHOD OF CONSTRUCTION

CROSS-REFERENCE TO RELATED APPLICATION

This application claims priority to U.S. Provisional Application Ser. No. 60/806,752, filed Jul. 7, 2006, which is incorporated herein by reference in its entirety.

BACKGROUND OF THE INVENTION

1. Technical Field

This invention relates generally to sleeve bearings, and more particularly to sleeve bearing assemblies having a self-lubricating inner journal bearing portion and an outer elastomeric portion for dampening shock loads, such as for use in a suspension system of a vehicle.

2. Related Art

Vehicle suspension components work together to serve a variety of functions, such as maintain proper ride height, maintain wheel alignment, support vehicle weight, maintain the tires in contact with the ground surface, control the vehicle direction of travel, and provide a smooth ride by dampening shock loads. Some of the components are coupled together via sleeve bearings to allow relative movement therebetween. Commonly, the sleeve bearings are fabricated having an outer portion constructed of rubber or urethane and an inner portion constructed of lubricious journal bearing material. The outer portion provides the dampening characteristics desired, while the inner portion reduces friction between the coupled components to allow the relative movement therebetween in use.

It is known to construct sleeve bearing assemblies, such as those described above, by knitting the inner portion first and injection molding the outer portion about the inner portion. The inner portion is known to be knitted from yarn compositions comprising a lubricious yarn material, such as polytetrafluoroethylene (PTFE) fibers, and a structural yarn material, such as polyester fibers. The two yarns are knitted together such that the PTFE follows the pattern of the polyester. Upon knitting the inner portion, it is stretched over an oversized mandrel to remove circumferential slack from the fabric and then located in a mold cavity, whereupon the outer portion is injection molded about the inner portion.

Although sleeve bearing assemblies constructed in accordance with the process described above can be generally effective in use, some improvements can be achieved. For example, the knitted sleeve bearing assemblies utilize an inefficient amount of PTFE in manufacture, given the PTFE follows the knitted pattern of the polyester. As a result, it has been determined that about three turns of PTFE are used in every revolution, and thus, only about 30 percent of the PTFE is actually required to provide a bearing surface, while the remaining 70 percent of the PTFE yarn is not necessary for use as a bearing surface. This ultimately results in cost inefficiencies, given the PTFE is generally the most costly fiber in the sleeve. Further, the resulting knitted inner portion typically allows the injected molten rubber to penetrate through the knitted yarns and into the bearing surface region of the sleeve. This occurs in part due to the need to stretch the fabric over the mandrel to remove slack from the fabric and because the knitted yarns do not provide a structure tight enough to prevent the rubber from penetrating therethrough. As such, the overall friction reducing effectiveness of the sleeve is reduced. In addition, while performing the injection molding of rubber in the known knitted sleeves, the rubber bonding to the outer surface of the knitted portion can cause the knitted portion to stretch further circumferentially, thereby causing a crease to form in the knitted portion. When this occurs, the product is scrap. Lastly, during the injection molding process, the mandrel becomes increasingly hotter from being exposed to the heat from the molten rubber, thereby presenting an assembly challenge to the operator stretching the inner portion over the mandrel. As such, the operator commonly wears heat resistant gloves, thus, complicating the job.

A sleeve bearing assembly manufactured according to the present invention overcomes or greatly minimizes any limitations of the prior art, such as those described above, for example.

SUMMARY OF THE INVENTION

A sleeve bearing assembly has an inner portion constructed from a plurality of yarns to provide a generally cylindrical journal bearing surface for receipt of a journal for relative movement therein and an elastic outer portion injection molded at least partially about the inner portion. The plurality of yarns are woven together with at least some of the yarns being woven in a warp direction corresponding to a length of the journal bearing surface and in a weft direction corresponding to a circumferential direction of the journal bearing surface to form a backing of the inner portion. At least one of the plurality of yarns is provided as a self-lubricating yarn woven with the backing in a weft direction to substantially form the bearing surface radially inwardly of the backing.

In accordance with another aspect of the invention, a method of constructing a sleeve bearing assembly having a generally cylindrical inner portion with a journal bearing surface and an outer portion extending at least partially about the inner portion is provided. The method includes constructing a backing of the inner portion by weaving yarns extending in a warp direction corresponding to a length of the journal bearing surface with yarns extending in a weft direction corresponding to a circumferential direction of the journal bearing surface. The method further includes weaving a self-lubricating yarn extending in a weft direction with the backing to substantially form the bearing surface. Further yet, disposing the inner portion in a mold cavity and molding the outer portion using an elastomeric material at least partially about the inner portion so that the outer portion bonds to the inner portion.

A sleeve bearing assembly manufactured in accordance with the present invention provides a uniform self-lubricating bearing surface, reduces friction relative to a journal received therein, provides a substantially continuous self-lubricating bearing surface, reduces the potential for scrap in manufacture, increases manufacturing efficiencies, reduces the overall cost associated with manufacturing the assembly, minimizes the use of expensive bearing surface materials, maximizes the percentage of total bearing surface material in contact with the journal, increases manufacturing efficiencies and reduces labor complexities, and increases the useful life of the sleeve bearing assembly.

BRIEF DESCRIPTION OF THE DRAWINGS

These and other objects, features and advantages will become readily apparent to those skilled in the art in view of the following detailed description of the presently preferred embodiments and best mode, appended claims, and accompanying drawings wherein like reference numerals are used to denote similar features, in which:

DETAILED DESCRIPTION OF PREFERRED EMBODIMENTS

Figure 1:
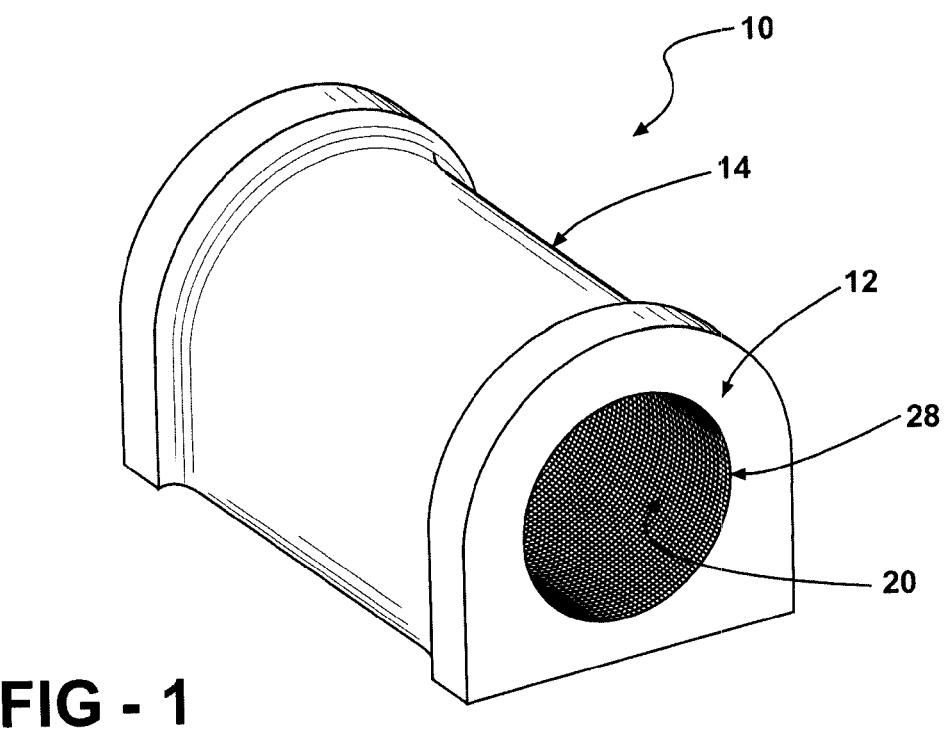
FIG. 1 is a schematic perspective view of a sleeve bearing assembly constructed in accordance with one presently preferred embodiment of the invention.
Figure 2:
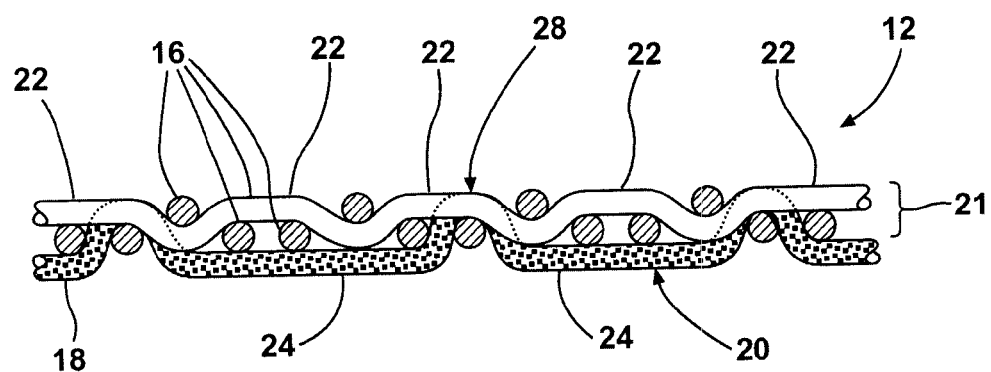
FIG. 2 is an enlarged fragmentary schematic cross-sectional view of the woven inner portion of the sleeve bearing assembly.

Referring in more detail to the drawings, FIG. 1 shows a sleeve bearing assembly 10 constructed according to one presently preferred embodiment of the invention. The sleeve bearing assembly 10 is particularly useful for applications requiring dampening and reduced friction support between members coupled to one another (not shown), such as in an anti-roll bar, a control arm, or other suspension locations within a suspension system of a vehicle, for example. The sleeve bearing assembly 10 has an inner portion 12 constructed from tightly woven yarns and an outer portion 14 that is injection molded at least partially about the inner portion 12. The outer portion 14 is formed from any suitable injection moldable dampening material, such as rubber or urethane compounds, for example. As shown in FIG. 2, the inner portion 12 is woven from a first multifilament yarn 16, such as polyester filaments, by way of example and without limitations, which primarily serves a structural function, and a second multifilament yarn 18, such as PTFE filaments (Teflon), polyoxymethalyne, or any other suitable lubricious, low coefficient of friction material which provides a self-lubricating inner bearing surface 20 to minimize friction against a journal surface (not shown). The inner bearing surface 20 is interlaced with an outer backing 21, with the outer backing 21 being constructed of woven yarns radially outwardly from the lubricious yarns 18 that substantially form the bearing surface 20. It should be recognized that due to the interlacing of the yarns 18 with the backing 21, that at least a portion of the backing 21 cooperates with the yarns 18 to form a relatively small portion of the bearing surface 20. The sleeve bearing assembly 10 is able to both reliably dampen vibration and forces via the outer portion 14, while also minimizing friction between a journal surface and the bearing surface 20 via the inner portion 12.

Figure 3:
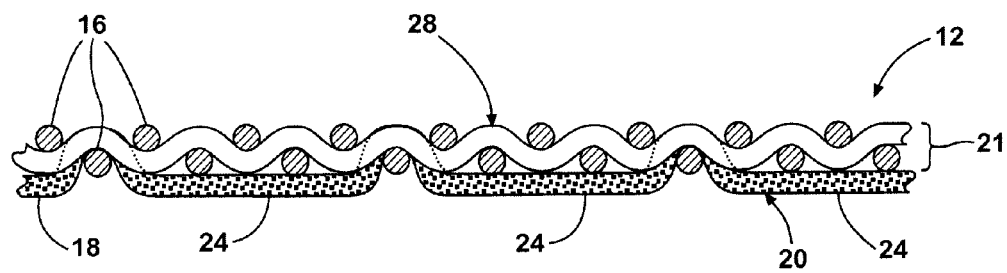
FIG. 3 is an enlarged fragmentary schematic cross-sectional view of a woven inner portion of a sleeve bearing assembly constructed according to another presently preferred embodiment.

As shown in FIG. 2, one presently preferred embodiment of the inner portion 12 is woven from the first and second yarns 16, 18 of polyester and PTFE, respectively. The yarns 16, 18 can be woven on a variety of circular loom styles, such as on one of the Loom Products circular looms (not shown), a narrow fabric needle loom (not shown, this method requires an coincident needle stitch along the length of the sleeve to join opposite edges, thereby creating a slightly upstanding seam along a length of the inner portion 12), or on a Mandals AS circular loom (not shown). The polyester yarn 16 is woven in both a warp direction (in and out of the paper as viewed in FIG. 2) and a weft direction to form the backing 21, while the PTFE yarn 18 is used only in the weft direction to substantially form the bearing surface 20. As mentioned, the polyester yarn 16 of the backing 21 acts primarily as a structural support for the PTFE yarn 18, and to assist in providing a barrier to the molten elastomeric material into the bearing surface region. The polyester yarn 16 is represented here, for example, as being woven in a 2:1 weft-faced twill pattern to form the backing 21, such that the polyester yarn 16 provides floats 22 across two polyester warp yarns 16 before passing under one polyester warp yarn 16. Otherwise, as shown in FIG. 3, another presently preferred embodiment includes weaving the polyester warp and weft yarns 16 in an even weave pattern to form the backing 21, sometimes referred to as a plain weave pattern. This pattern, generally excepted as being the most basic weave pattern, has the polyester weft yarn 16 passing over one polyester warp yarn 16 and under the next polyester warp yarn 16, and so on. Otherwise, the embodiment in FIG. 3 is the same as further discussed in relation to FIG. 2.

Referring back to FIG. 2, the PTFE yarn 18 is woven with the backing 21, with the PTFE yarn 18 extending only in the weft direction. The PTFE yarn 18 is woven in a sateen weave pattern, which is a weft-faced satin weave. Accordingly, the PTFE yarn 18 passes under four or more warp polyester yarns 16 of the backing 21 to provide floats 24, and is represented here, by way of example and without limitations, as passing under five polyester warp yarns 16 before passing over a polyester warp yarn 16. To provide a smoother inner bearing surface 20, the sateen weave is preferably woven with a shift of four PTFE yarn fibers 18 on every revolution. As a result of the sateen weave of the PTFE, approximately 80 percent or more of the PTFE yarn 18 is presented on the bearing surface 20, with the remaining portion the bearing surface 20 being provided by the polyester warp yarns 16 of the backing 21.

Figure 4:
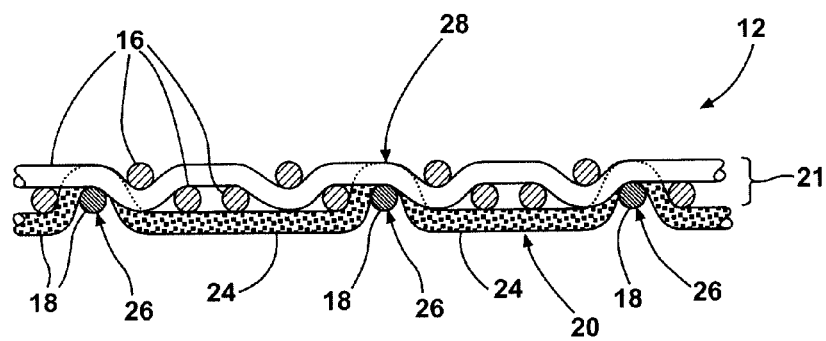
FIG. 4 is an enlarged fragmentary schematic cross-sectional view of a woven inner portion of a sleeve bearing assembly constructed according to yet another presently preferred embodiment.
Figure 5:
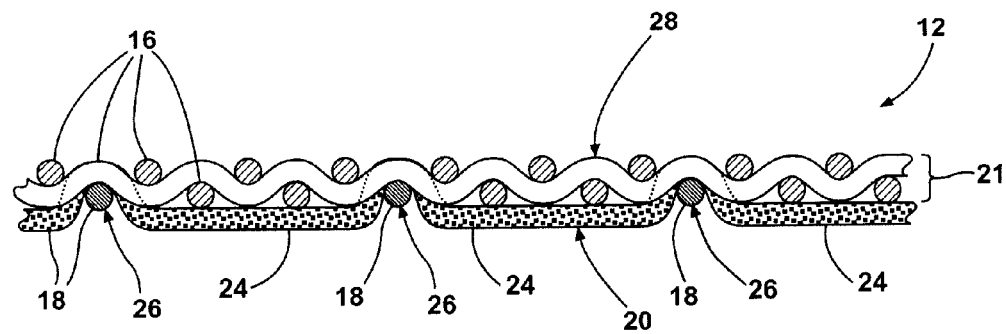
FIG. 5 is an enlarged fragmentary schematic cross-sectional view of a woven inner portion of a sleeve bearing assembly constructed according to yet another presently preferred embodiment.

In FIGS. 4 and 5, additional presently preferred embodiments of the inner portion 12 are shown, wherein the embodiments are similar to the embodiments shown in FIGS. 2 and 3, respectively. The notable difference in the embodiments of FIGS. 4 and 5 results from the warp yarns 26 of the backing 21 that extend between the floats 24 of the weft PTFE yarns 18 being provided as PTFE yarn 18, with the remaining warp yarns of the backing 21 remaining polyester yarns 16, as in the previously discussed embodiments. Accordingly, the select warp yarns 26 of the backing 21 along the weft yarns 18 provide the entire bearing surface 20 as a continuous, uninterrupted layer of PTFE yarn 18, thereby minimizing the friction of the bearing surface 20 against the journal.

Figure 6:
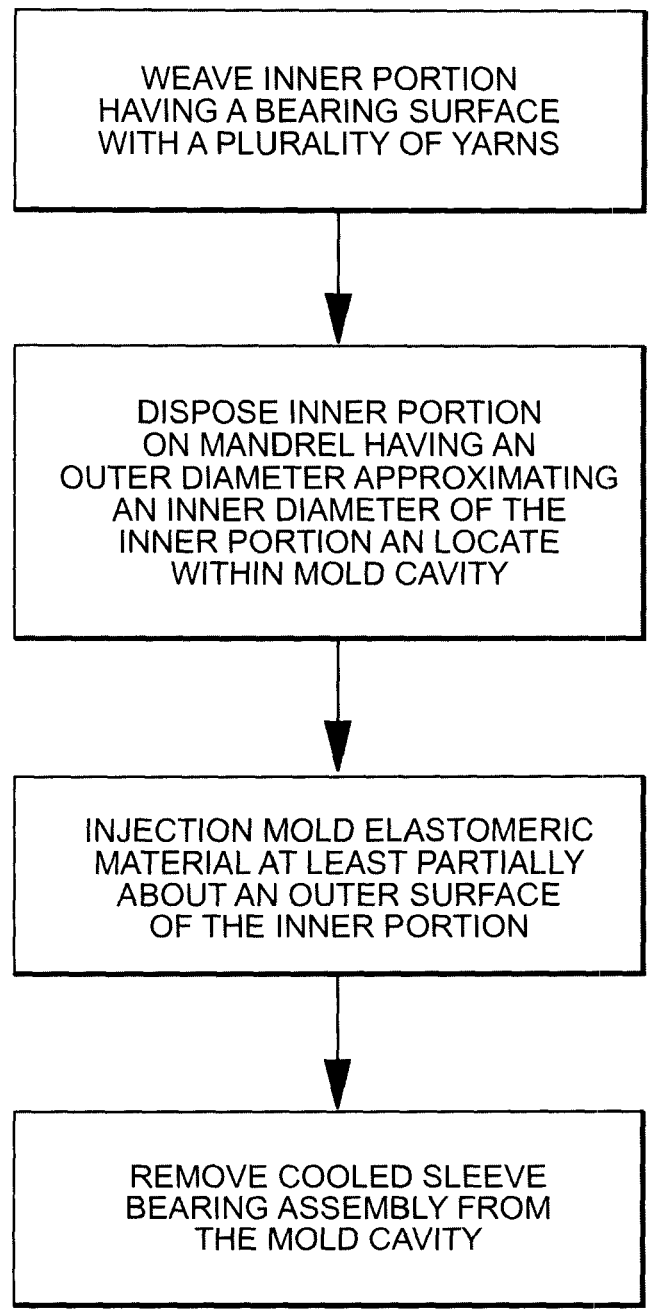
FIG. 6 is a diagrammatic representation in accordance with one presently preferred embodiment of a method for constructing the sleeve assemblies.

As shown in FIG. 6, upon weaving the inner portion 12 utilizing one of the presently preferred methods of weaving described above, the remaining operations are performed to construct the sleeve bearing assembly 10. The resulting inner portion 12 is preferably disposed on a mandrel of suitable size, preferably having an outer diameter approximating an inner diameter of the finished inner portion 12, and then located within a mold cavity of an injection mold machine. As such, the effort to place the inner portion 12 on the mandrel is minimized, given the inner portion is not stretched significantly in a circumferential direction. The outer portion 14 is then formed by injecting the desired elastic material, such as rubber, under pressure into the mold cavity and at least partially about an outer surface 28 the inner portion 12. The outer portion 14 is allowed to cool to a predetermined temperature and/or for a predetermined amount of time, and then the resulting sleeve bearing assembly 10 is removed from the mold cavity.

With the inner portion 12 being woven, as described above, the molten material within the mold cavity is not able to penetrate through the tightly woven yarns 16, 18 into the region of the bearing surface 20. The woven backing 21 further inhibits penetration of the molten material into the region of the bearing surface 20. Accordingly, the PTFE yarn 18 forming the bearing surface 20 is free from any unwanted increase in static and/or dynamic coefficients of friction which would otherwise result from the presence of the outer portion material on the bearing surface 20. In addition, the weave pattern of the backing 21 and the bearing surface 20 provides weft yarns 16, 18 in a circumferential direction about the inner portion 12 to provide a relatively high hoop strength, thereby eliminating the aforementioned problem of forming a crease in the inner portion 12 during the injection molding process. Accordingly, minimal scrap is produced. In addition, the plain or twill woven structure of the backing 21 provides a framework for maintaining the lubricious bearing surface 20 in their desired close abutting relation with one another in use, thereby extending the useful life of the assembly 10.

It is to be understood that other embodiments of the invention which accomplish the same function are incorporated herein within the scope of this invention. It is also to be understood that sleeve bearing assemblies can be manufactured in a variety of shapes and sizes and utilized in a variety applications and industries other than those mentioned above, and that the invention is defined by the claims that issue from this application and any related applications.

What is claimed is:

1. A sleeve bearing assembly, comprising:
an inner portion constructed from a plurality of yarns to provide a generally cylindrical journal bearing surface for receipt of a journal for relative movement therein;
an elastic outer portion injection molded at least partially about said inner portion; and
said plurality of yarns being woven together with at least some of said yarns being woven in a warp direction corresponding to a length of said journal bearing surface and in a weft direction corresponding to a circumferential direction of said journal bearing surface to form a backing and at least one of said plurality of yarns being provided as a self-lubricating yarn woven with said backing in a weft direction to substantially form said bearing surface.

2. The sleeve bearing assembly of claim 1 wherein said self-lubricating yarn is woven in a weft-faced sateen pattern.

3. The sleeve bearing assembly of claim 1 wherein said self-lubricating yarn floats under at least four of said yarns of said backing woven in the warp direction and passes over one of said yarns of said backing woven in the warp direction between floats adjacent to one another in the circumferential direction, said one of said yarns of said backing being provided as a self-lubricating yarn.

4. The sleeve bearing assembly of claim 1 wherein said backing is woven in a weft-faced twill pattern.

5. The sleeve bearing assembly of claim 4 wherein said backing is woven with polyester yarn.

6. The sleeve bearing assembly of claim 4 wherein selected ones of said warp yarns of said backing are provided as self-lubricating yarn.

7. The sleeve bearing assembly of claim 1 wherein said backing is woven in a plain weave pattern.

8. The sleeve bearing assembly of claim 7 wherein said backing is woven with polyester yarn.

9. The sleeve bearing assembly of claim 7 wherein selected ones of said warp yarns of said backing are provided as self-lubricating yarn.

10. The sleeve bearing assembly of claim 1 wherein said self-lubricating yarn is PTFE.

* * * * *